No. 842,688. PATENTED JAN. 29, 1907.
N. NILSON.
AUTOMATIC WEIGHING SCALE.
APPLICATION FILED MAY 9, 1905.

3 SHEETS—SHEET 1.

WITNESSES
F. C. Tanner
C. Macnamara

INVENTOR
NILS NILSON
BY Paul & Paul
HIS ATTORNEYS.

No. 842,688. PATENTED JAN. 29, 1907.
N. NILSON.
AUTOMATIC WEIGHING SCALE.
APPLICATION FILED MAY 9, 1905.

3 SHEETS—SHEET 2.

WITNESSES
F. O. Tanner
C. Mamamara

INVENTOR
NILS NILSON
BY
Paul & Paul
HIS ATTORNEYS.

No. 842,688.

PATENTED JAN. 29, 1907.

N. NILSON.
AUTOMATIC WEIGHING SCALE.
APPLICATION FILED MAY 9, 1905.

3 SHEETS—SHEET 3.

WITNESSES
F. O. Tanner
C. Macnamara

INVENTOR
NILS NILSON
BY Paul & Paul
HIS ATTORNEYS.

UNITED STATES PATENT OFFICE.

NILS NILSON, OF WAYZATA, MINNESOTA.

AUTOMATIC WEIGHING-SCALE.

No. 842,688.   Specification of Letters Patent.   Patented Jan. 29, 1907.

Application filed May 9, 1905. Serial No. 259,542.

*To all whom it may concern:*

Be it known that I, NILS NILSON, of Wayzata, Hennepin county, Minnesota, have invented certain new and useful Improvements in Automatic Weighing-Scales, of which the following is a specification.

My invention relates to weighing-scales of the rocker type, and is designed as an improvement over the scales shown and described in Letters Patent of the United States No. 643,423 and No. 702,463, issued to me February 13, 1900, and June 17, 1902.

The object of my invention is to provide an automatic rocker or lever scale which can be easily and quickly brought to a balance without going through the annoying oscillating period usually incident to scales of this kind.

A further object is to provide a scale capable of weighing an extremely light or heavy article, as desired.

A further object is to provide a scale that is comparatively simple in construction and strong and durable and not liable to get out of order and one that will be extremely accurate and reliable in its operation.

The invention consists, generally, in providing a lever or rocker scale wherein the load to be weighed is applied to the lever between the fulcrum and the balance-weight, thereby preventing the usual amount of oscillation characteristic of scales of this type.

Further, the invention consists in providing a scale having a beam adapted to receive a load at either end and capable, therefore, of weighing very light or comparatively heavy articles.

Further, the invention consists in providing a scale adapted to weigh up to a certain number of pounds and then by the addition of a weight made capable of weighing an additional load.

Further, the invention consists in various constructions and combinations, all as hereinafter described, and particularly pointed out in the claims.

Figure 7:
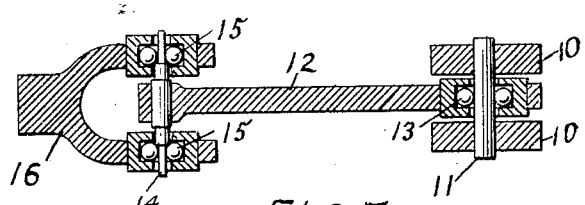
Figure 1:
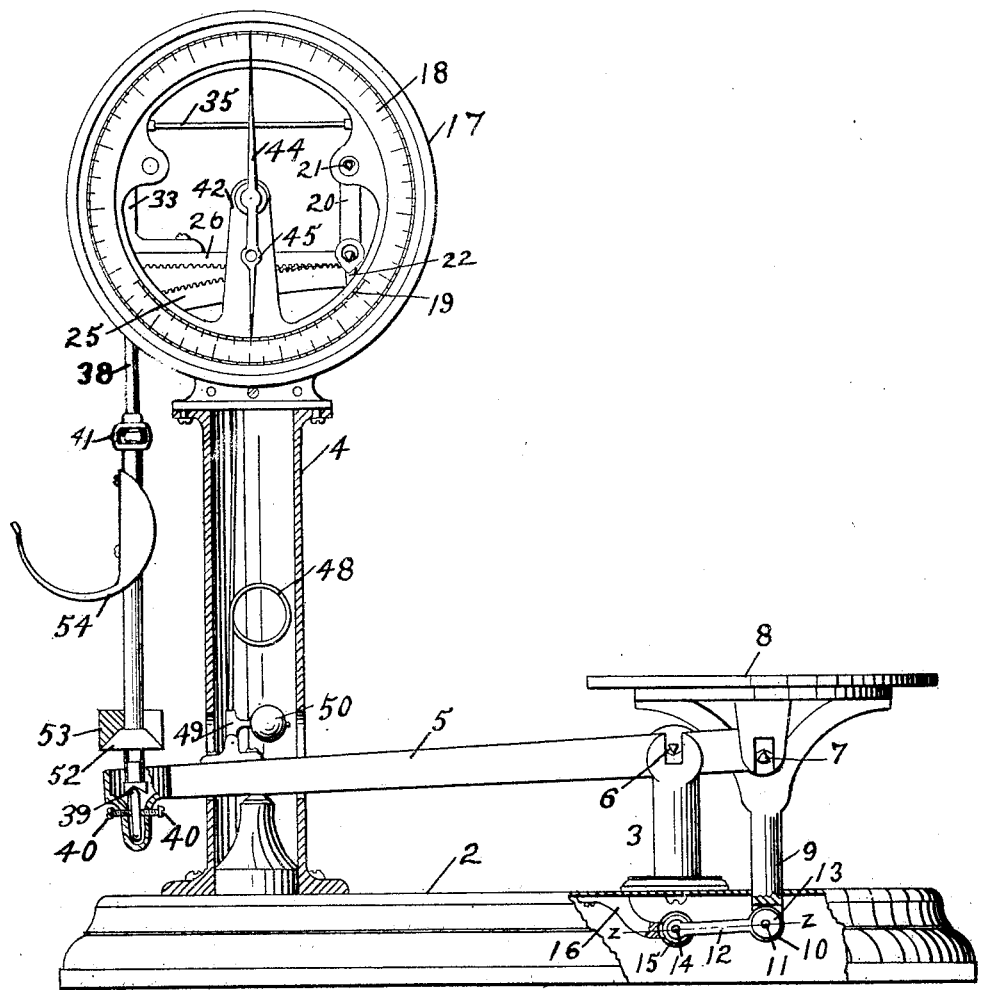
Figure 2:
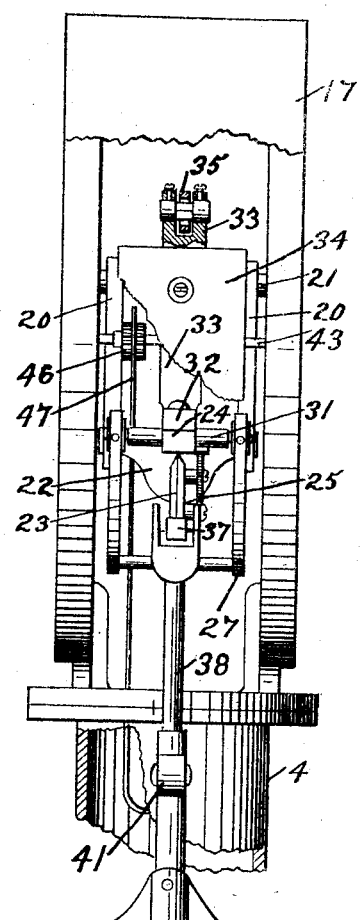
Figure 3:
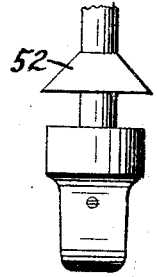
Figure 3:
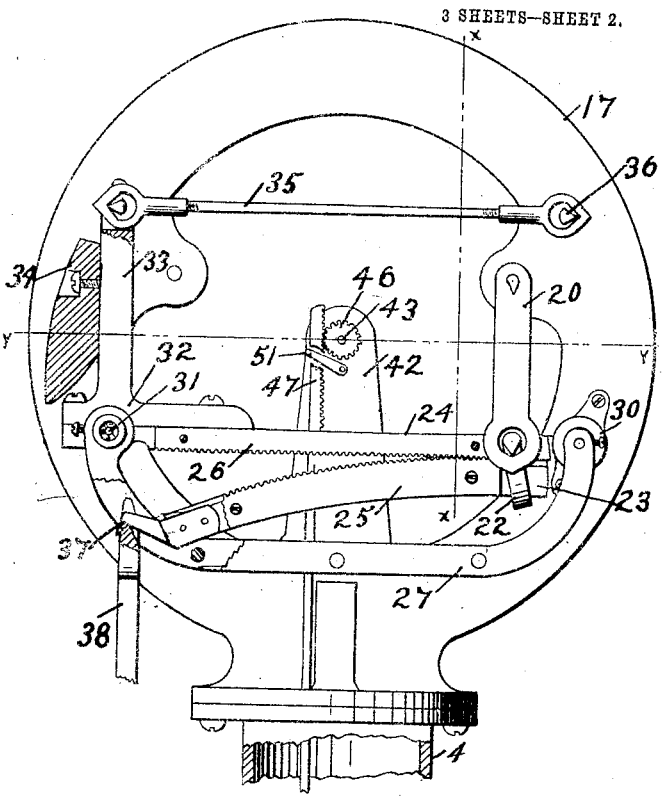
Figure 4:
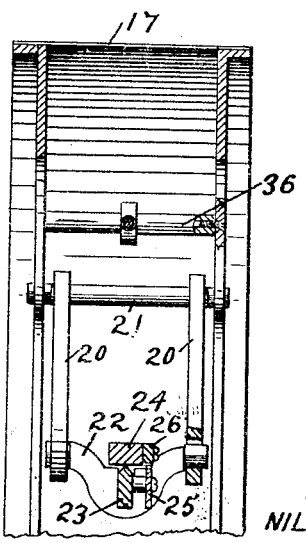
Figure 5:
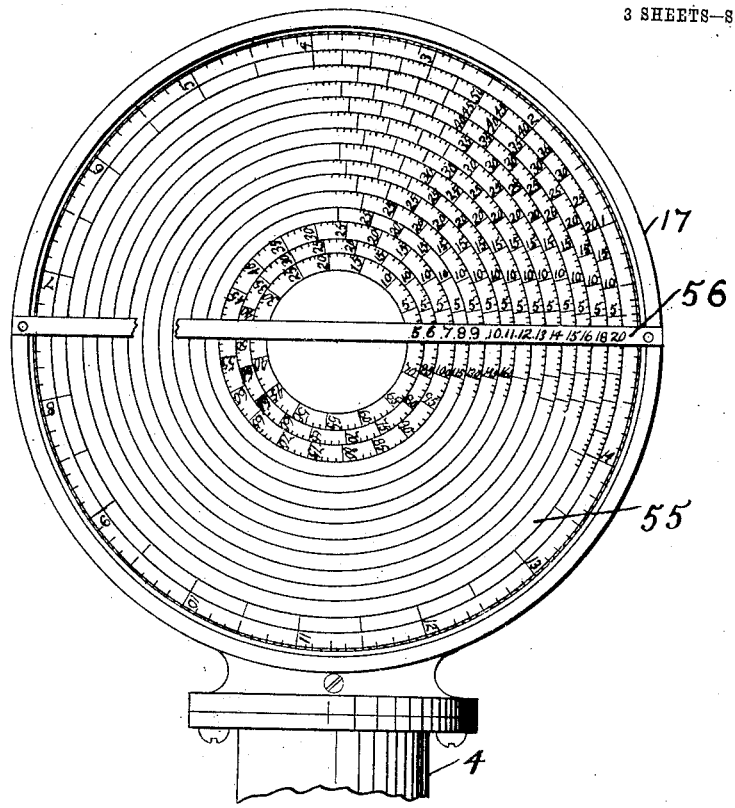
Figure 6:
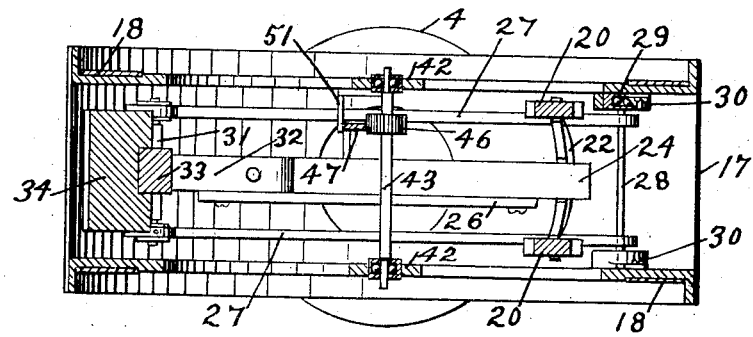

In the accompanying drawings, forming part of this specification, Figure 1 is a front elevation, partly in section, of a weighing-scale embodying my invention. Fig. 2 is an end view of the scale with the casing inclosing the operating mechanism partially broken away. Fig. 3 is a front view with the dial removed, illustrating the rocker mechanism. Fig. 4 is a sectional view on the line $x\,x$ of Fig. 3. Fig. 5 is a front view showing a computing-dial that is adapted to be placed over the dial shown in Fig. 1, the indicating-hand being removed. Fig. 6 is a sectional view on the line $y\,y$ of Fig. 3. Fig. 7 is a sectional view on the line $z\,z$ of Fig. 1, illustrating the connection between the standard of the scale-platform and the base of the scale.

In the drawings, 2 represents the base of the scale whereon upright standards 3 and 4 are arranged, the latter being hollow to receive the mechanism connecting the scale-beam with the rockers or levers between the dials.

5 is the scale-beam having the usual knife-edge bearings 6 on the standard 3 and provided on its short arm with bearings 7 for the scale-platform 8, on which the load to be weighed is placed. A hanger 9 depends from the under side of the platform 8 through the top of the base 2 and is provided with a forked lower end 10, having a pin 11. A link 12 has ball-bearings 13 at one end on said pin and is connected at its opposite end to a pin 14, that has ball-bearings 15 in a fork 16, secured to the base 2. This connection allows the standard and the scale-platform to rise and fall with the movement of the scale-beam, but limits the oscillation of the same.

A circular case 17 is mounted on the standard 4 and carries graduated dials 18, that may be marked to indicate any desired number of pounds, (in this instance, sixteen,) and an auxiliary scale 19 is also provided on one or both of the dials (shown on one) for the purpose hereinafter described.

Referring to Figs. 3 and 4 of the drawings, 20 represents links supported on a bearing 21 and carrying a yoke 22 at their lower ends. A lever 23 is supported at one end in the yoke 22 and has a curved upper edge, preferably wedge-shaped, to bear upon the flat under surface of the bar 24, that rests at one end upon said lever. Plates 25 and 26, having serrated edges, are secured on said lever and bar, said serrations meshing with one another to prevent lengthwise movement of the lever on said bar, but without in any way interfering with its rocking motion thereon. This feature of the scale has been, however, fully described in the patents above referred to, and I make no claim to the same herein. A yoke 27, also similar to the one described in my former patents, is supported at one end by a spindle 28, that has ball-bearings 29 at each end in boxes 30, secured to the casing of the dials. The opposite end of said yoke has similar ball-bearings on a spindle 31, carried by a casting 32, to which one end of the bar 24 is bolted. The casting 32 has an upright arm 33, whereon the balance or poise weight of the scale 34 is secured. The upper end of the arm 33 is forked and has bearings for one end of a rod 35, whose opposite end is carried by a fixed bearing 36 on the casing. This rod serves to hold the arm 33 in an upright position and while allowing vertical oscillation of the levers and bars prevents sidewise movement thereof. The bar 23 is curved downwardly between the sides of the yoke 27 and has a bracket 37 on its end resting in the forked upper end of the rod 38, which is supported at its lower end in a bearing 39 on the long arm of the scale-beam 5, said bearing being adjustable, by means of set-screws 40, to permit the beam to be properly adjusted to a standard weight. A turnbuckle device 41 is preferably provided in the rod 38, by means of which its length can be varied in adjusting the scale.

From an examination of Fig. 3 it will be noted that the load on the scale is applied to the lever or rocker at a point between its fulcrum and the balance-weight instead of having the fulcrum in the middle, the load on one side and the balance-weight on the other, as in one of my former patents above referred to. I regard this arrangement of the fulcrum and balance-weight as a decided improvement over the construction shown in my former patents, and it is also a very important feature of this scale, for I have found by its use that practically all of the oscillation incident to a scale having the fulcrum in the middle and the load and balance-weight on each side is avoided, and I am able to bring the scale to a balance in much less time and with more accuracy than has been possible with scales as ordinarily constructed.

In the rear of the rocker lever and bar are upright arms 42, having ball-bearings similar to those described for a spindle 43, arranged between them and carrying indicator-hands 44, that travel over the face of the dials as the spindle is revolved. One end of the hand points to the outer circle of graduations on the dial, and the other end, which I will designate by numeral 45, is provided with a loop to distinguish it from the opposite end and travels over the graduations 19 and in a direction opposite to the direction of movement of the other end of the hand. A pinion 46 is secured on the spindle 43 and meshes with a rack-bar 47, connected at its lower end to a spring 48, mounted in a pivoted arm 49 on the scale-beam 5. A weight 50, carried by said arm, normally holds the rack-bar in engagement with the teeth of the pinion, and the spring serves to relieve the shock or jar on the hand resulting from its sudden arrest of movement. The rack-bar is prevented from moving out of contact with the pinion by a suitable stop 51. When a load is placed on the platform 8, the scale-beam 5 will be tilted and the indicator-hand moved over the face of the dial. The lifting force of the load will be applied to the rocker-lever 23 at a point between the fulcrum of said lever and the balance-weight of the scale, and the said lever rocking on the bar 24 will come to a balance very quickly and with comparatively little preliminary oscillation, and consequently the indicator-hand will move in the first instance over the graduation representing the weight on the scale without swinging back and forth from one side to the other of said graduation before finally coming to a stop. It is therefore possible to weigh articles on the scale very quickly and accurately.

It is sometimes desirable in a scale of this kind to weigh an article that is heavier than the total of the graduations on the dials. I therefore provide a stop 52 on the rod 38, adapted to support a removable weight 53. If, for instance, the graduations on the dials indicate fifteen pounds and it is desired to weigh an article of twenty pounds or more, the operator will hang the auxiliary weight 53 on the rod 38, and then noting that this weight will balance the scale with fifteen pounds on the platform will add the amount in pounds indicated by the pointer on the dial to the total of the graduations thereon, and thus arrive accurately at the weight of the load on the scale-platform, assuming, of course, that the weight 53 will just balance the scale with a load of fifteen pounds. If it is desired to weigh out a package of a commodity representing more in pounds than the total of the graduations on the dial—as, for instance, sugar or flour—the person using the scale will hang the auxiliary weight on the rod 38 and deposit the commodity upon the scale-platform until the desired weight is reached, and then the sum of the total graduations of the dial and the graduation to which the hand points after the commodity has been placed upon the scale-platform will be the total weight of the load. It is also desirable in a scale of this kind to provide means for weighing a very light article, too light, in fact, to be readable on the dial. I therefore mount a hopper 54 on the rod 38 and place a light weight, such as weight 53, on the scale-platform to move the end 45 of the indicator-hand to the zero-point of graduations 19. I then place the article to be weighed in the hopper 54, and the hand 45 moving over the graduations 19 will indicate the weight of the article. The weight in the hopper will have a long leverage on the scale-platform, and consequently a very small article in the hopper will balance a considerable weight on the platform, and I am thus able to accurately weigh very small articles or a very little quantity of a commodity which ordinarily cannot be weighed on a scale of this type.

In Fig. 5 I have shown a modification which consists in removing the indicator-hand from the dial on one side and substituting in place thereof a computing-dial 55, which revolves past a fixed bar 56, provided with marks or graduations representing the price per pound of the articles being sold. The outer edge of the dial 55 is graduated to represent pounds and fractions thereof, and the space between the graduations and the center of the dial is utilized for marks representing the purchase-price of the different articles of different weight. This is the ordinary computing-dial, and the price of the article sold is determined in the usual way by glancing at the dial after the article has been placed on the scale-platform.

I claim as my invention—

1. In an automatic scale, the combination with a frame, of members rocking one upon the other and having supporting-pivots, a balance-weight carried by one of said members, a guiding means connecting said balance-weight member with said frame and means for applying the pressure of the load to be weighed to the other member at a point between its pivots and said balance-weight, substantially as described.

2. In an automatic scale, the combination, with a frame, of opposing contacting members having respectively plain and curved faces and rocking one upon another and having supporting-pivots, a balance-weight carried by one of said members, a guiding means for said balance-weight member, and means for applying the pressure of the load to be weighed to the other member at a point between its pivots and said balance-weight, substantially as described.

3. In an automatic scale, the combination, with an opposing contacting-lever and a bar rocking one upon the other and pivotally supported near one end, a balance-weight provided near the opposite end of said bar, and means for applying the pressure of the load to be weighed to said lever at a point between said pivots and said balance-weight, for the purpose specified.

4. In an automatic scale, the combination, with a rocker-lever 23 having supporting-links 20, of a bar 24 contacting with said lever 23, a yoke 27 pivotally supported at one end near said links 20 and having a pivotal connection with said bar at its opposite end, a balance-weight support near the pivots of said yoke 27 on said bar, and means for applying the pressure of the load to be weighed to said lever at a point between said links 20 and said balance-weight, substantially as described.

5. In an automatic scale, the combination, with a rocker-lever 23 and links 20, of a bar 24 contacting with said lever, a yoke 27 pivotally supported at one end near said links and having at its opposite end a pivotal connection with said bar, a casting 32 whereon said bar is bolted and having an arm 33, a weight carried by said arm, and means for applying pressure of the load to be weighed to said lever between its pivots and said weight, substantially as described.

6. In an automatic scale, a pivoted beam having a short arm and a platform carried thereby, a graduated dial, an indicator-hand therefor, a lever mechanism operatively connected with said hand and the long arm of said beam for balancing the load on said platform, and a removable weight arranged between said mechanism and said beam to depress said long arm and balance a predetermined load on said platform to adapt the scale for weighing a greater load than represented by the total of the graduations on the dial, substantially as described.

7. In an automatic scale, a pivoted beam having a short arm and a platform carried thereby, a graduated dial, an indicator-hand therefor, opposing contacting members rocking one upon the other and connected with said beam, means connecting said indicator with said beam, and a removable weight device provided on the connection between said opposing members and said beam and adapted to balance a predetermined load on said platform to adapt the scale for weighing a greater load than represented by the total of the graduations on the dial, substantially as described.

8. In an automatic scale, a pivoted beam having a short arm and a platform carried thereby, a graduated dial, an indicator-hand therefor operatively connected with the long arm of said beam, opposing contacting members having movable pivots, a rod connecting one of said members with the long arm of said beam, and a weight removably arranged on said rod, for the purpose specified.

9. In an automatic scale, a pivoted beam having a short arm and a platform carried thereby, a dial having primary and secondary graduations the latter representing fractions of the former and being readable in the opposite direction, an indicator arranged to travel over said primary and secondary graduations and operatively connected with the long arm of said pivoted beam, opposing members having movable pivots, a rod connecting one of said members and the long arm of said beam, and a hopper provided on said rod and adapted to contain an article whose weight is indicated by the backward movement of the pointer over said secondary graduations, substantially as described.

10. In an automatic scale, a pivoted beam having a short arm and a platform thereon, a dial having primary and secondary graduations, the latter representing fractions of the former and being readable in the opposite direction, a pointer having one end to travel over said primary graduations and the other in the opposite direction over the secondary graduations, and means connecting said pointer with the long arm of said beam.

11. In an automatic scale, a pivoted beam having a short arm and platform thereon, a dial having primary and secondary graduations, the latter representing fractions of the former and being readable in the opposite direction, a pointer having one end to travel over said primary graduations and the other end in the opposite direction over said secondary graduations, means connecting said pointer with the long arm of said beam, and a support provided on said connecting means and whereon comparatively light articles can be placed and their weight indicated by the movement of said pointer over said secondary graduations, substantially as described.

12. In an automatic scale, the combination with a frame, of opposing contacting members rocking one upon the other and having supporting-pivots near one end, a balance-weight provided at the opposite end of one of said members, means for applying the pressure of the load to be weighed to the other member at a point between said pivots and said balance-weight, and a rod pivotally connecting said weight-carrying member with said frame, for the purpose specified.

In witness whereof I have hereunto set my hand this 2d day of May, 1905.

NILS NILSON.

Witnesses:
RICHARD PAUL,
C. MACNAMARA.